United States Patent
Kim et al.

(10) Patent No.: US 10,754,914 B2
(45) Date of Patent: Aug. 25, 2020

(54) METHOD AND DEVICE FOR UNSUPERVISED INFORMATION EXTRACTION

(71) Applicant: Robert Bosch GmbH, Stuttgart (DE)

(72) Inventors: Doo Soon Kim, Los Gatos, CA (US); Chen Chen, Richardson, TX (US)

(73) Assignee: Robert Bosch GmbH, Stuttgart (DE)

( * ) Notice: Subject to any disclaimer, the term of this patent is extended or adjusted under 35 U.S.C. 154(b) by 841 days.

(21) Appl. No.: 15/245,265

(22) Filed: Aug. 24, 2016

(65) Prior Publication Data
US 2018/0060337 A1    Mar. 1, 2018

(51) Int. Cl.
| | |
|---|---|
| G06F 16/00 | (2019.01) |
| G06F 16/958 | (2019.01) |
| G06F 16/23 | (2019.01) |
| G06F 16/22 | (2019.01) |
| G06F 16/2457 | (2019.01) |
| G06F 16/80 | (2019.01) |
| G06F 16/955 | (2019.01) |

(52) U.S. Cl.
CPC ........ G06F 16/958 (2019.01); G06F 16/2282 (2019.01); G06F 16/23 (2019.01); G06F 16/24578 (2019.01); G06F 16/80 (2019.01); G06F 16/955 (2019.01)

(58) Field of Classification Search
CPC .... G06F 16/951; G06F 16/955; G06F 16/958; G06F 16/252; G06F 16/972; G06F 16/285; G06F 16/2228; G06F 16/2282; G06F 16/907; G06F 16/00; G06F 16/24573; G06F 16/95
See application file for complete search history.

(56) References Cited

U.S. PATENT DOCUMENTS

| | | | |
|---|---|---|---|
| 6,920,609 B1 | 7/2005 | Manber et al. | |
| 9,020,947 B2* | 4/2015 | Yan | G06F 16/337 707/738 |
| 2009/0319481 A1 | 12/2009 | Chitrapura et al. | |
| 2010/0257440 A1* | 10/2010 | Kshirsagar | G06F 16/986 715/230 |

(Continued)

FOREIGN PATENT DOCUMENTS

WO    2010126892 A1    11/2010

OTHER PUBLICATIONS

He, Xiaoxi, et al. "Disentangling Redundancy for Multi-Task Pruning." arXiv preprint arXiv:1905.09676 (2019).*

(Continued)

*Primary Examiner* — Nan Hutton
(74) *Attorney, Agent, or Firm* — Maginot, Moore & Beck LLP

(57) ABSTRACT

A method of adding informative content to an electronic knowledge base includes generating a plurality of database tables from a plurality of websites, each database table based on a corresponding website, and individually processing each database table to identify potentially informative content from each database table. The method further includes identifying as informative content, the potentially informative content that is included in a first predetermined number of the database tables of the plurality of database tables, the first predetermined number being greater than one, and adding the informative content to the electronic knowledge base.

16 Claims, 8 Drawing Sheets

(56) References Cited

U.S. PATENT DOCUMENTS

2012/0243727 A1\* 9/2012 Hwang ................ G06T 1/0085
382/100
2013/0085745 A1 4/2013 Koister et al.
2014/0070966 A1\* 3/2014 Fablet ................ H03M 7/3086
341/55

OTHER PUBLICATIONS

Grigalis, Tomas, and Antanas Čenys. "Unsupervised structured data extraction from template-generated web pages." Journal of Universal Computer Science (J. UCS) 20.3 (2014): 169-192.\*
Wong, Tak-Lam, and Wai Lam. "An unsupervised method for joint information extraction and feature mining across different web sites." Data & Knowledge Engineering 68.1 (2009): 107-125.\*
Yanhong Zhai et al., Web Data Extraction Based on Partial Tree Alignment, Proceedings of the 14th International Conference on World Wide Web, 2005, pp. 76-85, New York, USA.

\* cited by examiner

METHOD AND DEVICE FOR UNSUPERVISED INFORMATION EXTRACTION

FIELD

This disclosure relates to the field of information extraction and in particular to improving the usefulness of the data generated by unsupervised information extraction.

BACKGROUND

Massive amounts of data are stored on the Internet as HTML websites. Typically, the data is organized and presented in a manner that is easily understood by human readers. For example, in viewing a webpage of a website containing information describing suitable parking areas, a human reader is typically able to locate and to understand the pertinent information. The human reader skims the webpage for context clues or labels that point to or suggest the location of the pertinent information. The human reader locates the pertinent information even if the information is contained in a table or mixed within blocks of texts. After locating the pertinent information, the human reader records the information or makes a mental note thereof so that the pertinent information can be used at the appropriate time, such as when navigating to a desired parking area. As set forth above, the human reader is capable of skimming through a multi-paragraph webpage and locating the pertinent information in a matter of seconds; however, it is difficult for computers to identify efficiently the pertinent information from a webpage.

Information extraction ("IE") refers to the process of using a computer to extract pertinent information from a website. The extracted information is then stored to a database of organized pertinent information that is easily accessible and searchable by other computers. Known methods of IE are either supervised or unsupervised. Supervised IE requires an engineer or technician to review the information extracted from a website and to manually determine if the information is desirable. That is, the engineer or technician manually discriminates between unuseful or uninteresting information and useful or interesting information. The engineer causes the computer to store the useful, interesting, and/or informative information (hereinafter collectively "informative content") to a database and to discard the unuseful or uninteresting information by creating a set rules or training examples for the computer to follow. Some of the rules and training examples may be specific to the extracted information of only a single website or webpage; whereas, other rules may have a more global usage, such that over time the computer may become more efficient at identifying the informative content. Unsupervised IE does not require an engineer or technician to create rules for determining if the extracted information is useful or interesting. Instead, a computer engaged in unsupervised IE performs statistical analysis over the extracted information to identify the informative content and outputs the desired data in database table form. Since unsupervised IE requires little to no human intervention, it is typically faster and more efficient than supervised IE.

Unsupervised IE is typically less accurate than supervised IE. Typically, known systems performing unsupervised IE generate "false positives," which are data that a human would consider unuseful or uninteresting but that the computer determined to be useful or interesting. The accuracy of the system is reduced when the system stores false positives to a knowledge base of informative content. Moreover, if the informational content of a website is not presented in a manner that conforms to the statistical analysis approach applied by the computer, then the computer may not properly extract and organize the informative content.

Unsupervised IE has the potential to more efficiently add informative content to knowledge bases. However, there is a continuing need to increase the precision and recall of unsupervised IE. Thus, further developments in the area of unsupervised IE are desirable.

SUMMARY

According to an exemplary embodiment of the disclosure, a method of adding informative content to an electronic knowledge base includes generating a plurality of database tables from a plurality of websites, each database table based on a corresponding website, and individually processing each database table to identify potentially informative content from each database table. The method further includes identifying as informative content, the potentially informative content that is included in a first predetermined number of the database tables of the plurality of database tables, the first predetermined number being greater than one, and adding the informative content to the electronic knowledge base.

According to another exemplary embodiment of the disclosure, an information extraction system includes a remote computer operably connected to the Internet and including a processor configured to generate a plurality of database tables from a plurality of websites accessible via the Internet, each database table based on a corresponding website, individually process each database table to identify potentially informative content from each database table; identify as informative content, the potentially informative content that is included in a first predetermined number of the database tables of the plurality of database tables, the first predetermined number being greater than one; and add the identified informative content to an electronic knowledge base.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
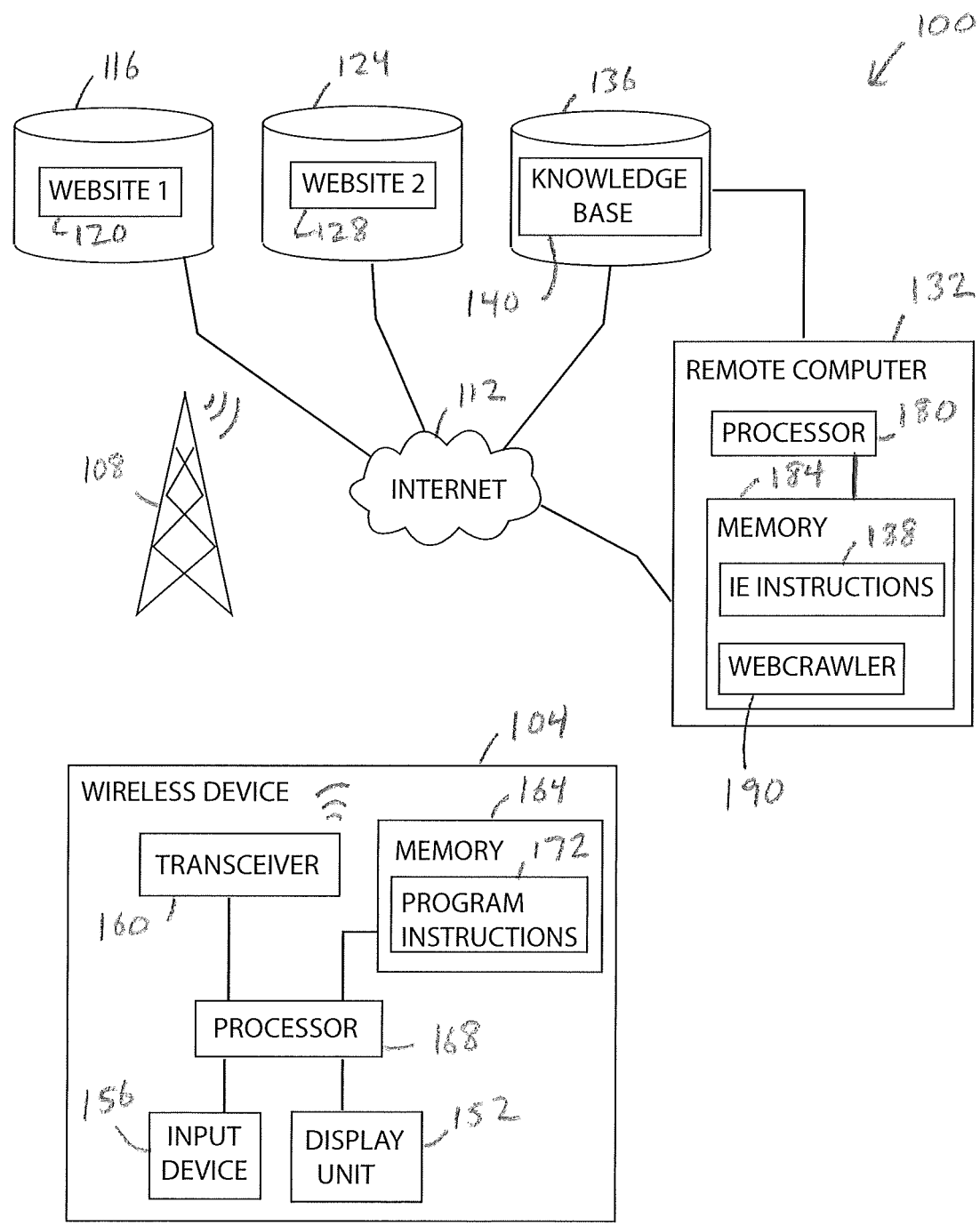
FIG. 1 is a block diagram of an unsupervised information extraction system as disclosed herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, an information extraction system 100 includes a wireless communication device 104 configured for communication with a cellular network 108 and the Internet 112, a first data server 116 configured to serve and to store a first website 120, a second data server 124 configured to serve and to store a second website 128, a remote computer 132 configured for communication with the Internet 112, and a third data server 136 electrically connected to the remote computer 132 and configured to serve and to store an electronic knowledge base 140. The IE system 100 is configured to add informative content (i.e. useful, interesting, and/or desired information) to the knowledge base 140 by extracting information from at least the websites 120, 128 without supervision through a process of unsupervised IE that utilizes two types of redundancy processing. Specifically, the process used by the IE system 100 accurately distinguishes informative content from non-informative content (i.e. unuseful, uninteresting, and/or undesired information) by processing the data extracted from at least the websites 120, 128 using an intra-redundancy approach and an inter-redundancy approach. The two types of redundancy processing greatly increase the precision and the recall of the IE system 100, such that fewer false positives are generated and stored to the knowledge base 140. The components of the IE system 100 are described below followed by a description of a method 400 (FIG. 4) used by the IE system 100 to add informative content to the knowledge base 140.

The wireless communication device 104 is an exemplary client device configured to send queries to the knowledge base 140 via the Internet 112 and to receive data stored in the knowledge base 140 via the Internet 112. The device 104 includes a display unit 152, an input device 156, a transceiver 160, and a memory 164 each operably connected to a processor 168. The wireless device 104 is typically a cellular phone, a mobile phone, a smartphone, a tablet computer, or any other suitable device.

The display unit 152 is a liquid crystal display (LCD) panel configured to display text, images, and other visually comprehensible data. The display unit 152, in another embodiment, is any display as desired by those of ordinary skill in the art, including, but not limited to, an active-matrix organic light-emitting diode display.

The input device 156 is configured to enable a user to enter data and to manipulate objects shown on the display unit 152. For example, the input device 156 is configured to generate input data corresponding to an inquiry to be sent to the knowledge base 140. In another embodiment, the input device 156 is a touchscreen applied over the display unit 152 that is configured to respond to the touch of a finger or a stylus. In yet another embodiment, the input device 156 is any device configured to generate an input signal, as desired by those of ordinary skill in the art.

The transceiver 160, which is also referred to as a wireless transmitter and receiver, is operably connected to the processor 168 and is configured to wirelessly communicate with the cellular network 108, a wireless local area network ("Wi-Fi"), a personal area network, and/or any other wireless network. Accordingly, the transceiver 160 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The processor 168 is configured to execute program instructions 172 stored in the memory 164 for operating the components connected thereto, such as the display unit 152, the input device 156, and the transceiver 160. The processor 168 is a provided as a microprocessor, a controller, or any other type of electronic control chip. In one embodiment, the processor 168 executes the program instructions 172 (i.e. software, an application, or an "app"), which are downloaded from the Internet 112. For example, program instructions 172 for sending an inquiry to the knowledge base 140 and for receiving selected data from the knowledge base 140 may be downloaded from the Internet 112, stored in the memory 164, and executed by the processor 168.

The memory 164 is an electronic data storage unit, which is also referred to herein as a non-transient computer readable medium. As set forth herein, the memory 164 is configured to store the program instructions 172 for operating the wireless device 104. Any other electronic data may also be stored in the memory 164, such as data that is downloaded from the knowledge base 140 via the Internet 112.

The first data server 116 is operably connected to the Internet 112 and is configured to serve and to store data associated with at least the first website 120. More particularly, the data server 116 receives data from the Internet 112 that is directed to the first website 120 and sends or serves data to client devices, such as the wireless device 104 and the remote computer 132, in response to the website 120 being accessed via the Internet 112.

The second data server 124 is operably connected to the Internet 112 and is configured to serve and to store data associated with at least the second web site 128. The data server 124 is configured to receive data from the Internet 112 that is directed to the second web site 128 and to send or serve data to client devices in response to the web site 128 being accessed via the Internet 112.

The third data server 136 is operably connected to the Internet 112 and to the remote computer 132. The third data server 136 is configured to serve and to store data associated with at least the knowledge base 140. The data server 136 receives informative content data from the remote computer 132 that is to be stored or added to the knowledge base 140. The data server 136 also receives inquiry data from client devices directed to the knowledge base 140, and sends or serves data to the client devices in response to the inquiry data. As shown in FIG. 1, the data server 136 is directly electrically connected to the remote computer 132. In other embodiments, the data server 136 may be indirectly electrically connected to the remote computer 132 through the Internet 112 or another computer network.

The knowledge base 140 is a database of informative content at least partially built by the remote computer 132. The knowledge base 140 includes informative content extracted from the websites 120, 128, for example. The knowledge base 140, in one embodiment, is a specialized knowledge base including informative content pertaining to a particular field of study or area of interest. In other embodiments, the knowledge base 140 is a general knowledge base that includes all types of informative content. In one specific example, the knowledge base 140 includes informative content related to automobile parking information in and around the airports of a certain geographic area. The knowledge base 140 is configured to receive and to process inquiry data related to the parking information and to provide the corresponding client device with informative content related to the inquiry. For example, a client device may send an inquiry to the knowledge base 140 asking, "What is the least expensive parking lot near the Mineta San Jose International Airport?" The knowledge base 140 may respond with informative content data that includes the address of the parking lot and the cost per day or hour to park there.

The remote computer 132 includes a processor 180 operably connected to a memory 184 that is configured to store program instructions 188 and a web crawler program 190. The program instructions 188 and the web crawler program 190 are associated with the unsupervised information extraction method 400. The processor 180 is a provided as a microprocessor, a controller, or any other type of electronic control chip. The memory 184 is an electronic data storage unit, which is also referred to herein as a non-transient computer readable medium. As set forth herein, the memory 184 is configured to store the program instructions 188. Any other electronic data may also be stored in the memory 184, such as the web crawler 190 data, web scraper data, and other data that is downloaded from the knowledge base 140 and the wireless device 104 via the Internet 112.

Figure 2:
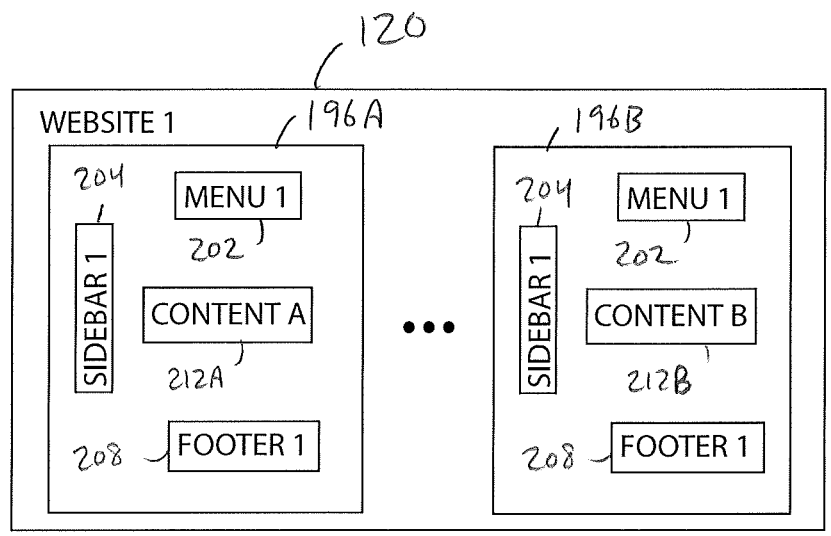
FIG. 2 is a block diagram of an exemplary first website having data to be extracted by the unsupervised information extraction system of FIG. 1.
Figure 3:
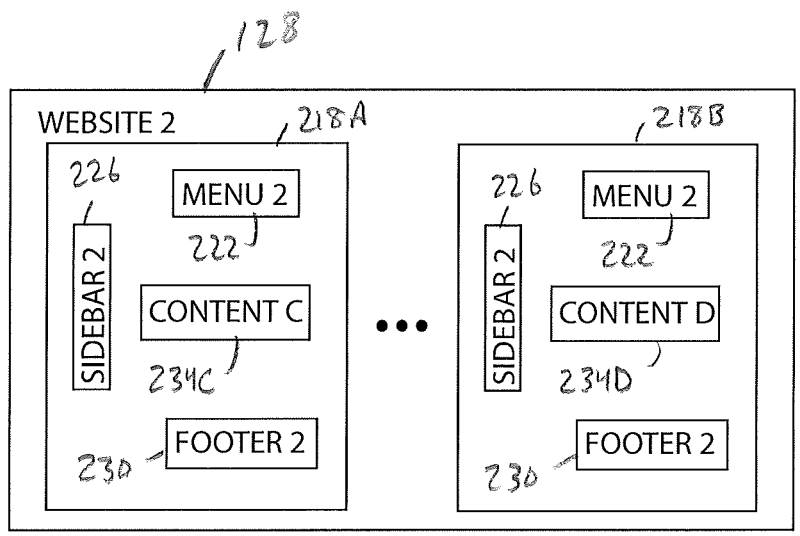
FIG. 3 is a block diagram of an exemplary second website having data to be extracted by the unsupervised information extraction system of FIG. 1.

To assist in describing the method 400, an exemplary configuration of the websites 120, 128 are shown in FIGS. 2 and 3, respectively. The first website 120 includes an internet protocol address ("IP address") so that the website 120 is addressable on the Internet 112. The first website 120 also includes a uniform resource locator ("URL") which is associated with the IP address. The URL and the IP address of the first website 120 are registered with a domain name server (not shown) so that the website 120 is accessible by the remote computer 132 and the wireless device 104. The second website 128 also includes an IP address so that the website 128 is addressable on the Internet 112. The second website 128 includes a URL which is associated with the IP address. The URL and the IP address of the second website 128 are registered with a domain name server so that the second website 128 is accessible by the remote computer 132 and the wireless device 104. The hostname of the URL and the IP address of the second website 128 are different from the hostname of the URL and the IP address of the first website 120.

As shown in FIG. 2, the first website 120 includes a plurality of webpages 196A, 196B two of which are illustrated. The website 120 may have from two to fifty webpages 196A, 196B, for example. Each webpage 196A, 196B includes a plurality of content items including a menu 202, a sidebar 204, a footer 208, and an area of content 212A, 212B. The menu 202, the sidebar 204, and the footer 208 are the same, substantially the same, or identical on each webpage 196A, 196B. The menu 202 includes links to the webpages 196A, 196B, for example. The menu 202 includes the same links on each of the webpages 196A, 196B. The sidebar 204 includes text that is deemed applicable to each of the webpages 196A, 196B, for example. The sidebar 204 includes the same text on each of the webpages 196A, 196B. The footer 208 includes contact information and links to other websites, for example. The footer 208 includes the same contact information and links on each of the webpages 196A, 196B. The content 212A, 212B of the first website 120 includes text, numbers, and/or other symbols organized in tables, paragraphs, or any other arrangement. The content 212A, 212B is different on each webpage 196A, 196B. As such, the content 212A is different from the content 212B. Each webpage 196A, 196B of the website 120 is also referred to herein as an HTML document.

As shown in FIG. 3, the second website 128 includes a plurality of webpages 218A, 218B two of which are illustrated. Each webpage 218A, 218B includes a menu 222, a sidebar 226, a footer 230, and an area of content 234C, 234D. The menu 222, the sidebar 226, and the footer 230 are the same, substantially the same, or identical on each webpage 218A, 218B and are different from the menu 202, sidebar 204, and footer 208 of the website 120. The menu 222 includes links to the webpages 218A, 218B, for example. The menu 222 includes the same links on each of the webpages 218A, 218B. The sidebar 226 includes text that is deemed applicable to each of the webpages 218A, 218B, for example. The sidebar 226 includes same text on each of the webpages 218A, 218B. The footer 230 includes contact information and links to other websites, for example. The footer 230 includes the same contact information and links on each of the webpages 218A, 218B. The content 234C, 234D of the website 128 includes text organized in tables, paragraphs, or any other arrangement. The content 234C, 234D is different on each webpage 218A, 218B and is different, at least in some ways, from the content 212A, 212B of the website 120. Each webpage 218A, 218B is also referred to herein as an HTML document.

Operation of the System

In operation, the processor 180 of the remote computer 132 executes the program instructions 188 to perform the method 400 of unsupervised IE from at least the websites 120, 128. In the description of the method 400, statements that the method 400 is performing some task or function refers to a controller or a general purpose processor executing programmed instructions stored in non-transitory computer readable storage media operatively connected to the controller or the processor to manipulate data or to operate one or more components in the IE system 100 to perform the task or function. Particularly, the processor circuitry/logic of the processor 180 of the remote computer 132 and/or the processor 168 of the device 104 can be such a controller or processor. Alternatively, the processors 168, 180 can be implemented with more than one processor and associated circuitry and components, each of which is configured to form one or more tasks or functions described herein. Additionally, the method 400 may be performed in any feasible chronological order, regardless of the order shown in the figures or the order in which the method 400 is described.

The method 400 causes the remote computer 132 to add informative content from websites, such as the web sites 120, 128, to a knowledge base, such as the knowledge base 140. The method 400 determines the "interestingness" of the content of the websites 120, 128 and, in one embodiment, only adds informative content to the knowledge base 140. The method 400 identifies the informative content, if any, contained in the websites 120, 128 by utilizing two types of redundancy processing. The first type of redundancy processing is redundancy across webpages of a particular website 120, 128 (i.e. intra-redundancy), and the second type of redundancy processing is redundancy across different websites 120, 128 (i.e. inter-redundancy). In short, informative content is typically not intra-redundant is typically inter-redundant. With these two types of redundancy processing, the method 400 performs unsupervised IE of a plurality of websites. The method 400 identifies the informative content and stores the informative content in the knowledge base 140, so that a client computer, such as the wireless device 104, can access and manipulate the extracted information in an automated fashion.

Extract Data from Input Websites

Figure 4:
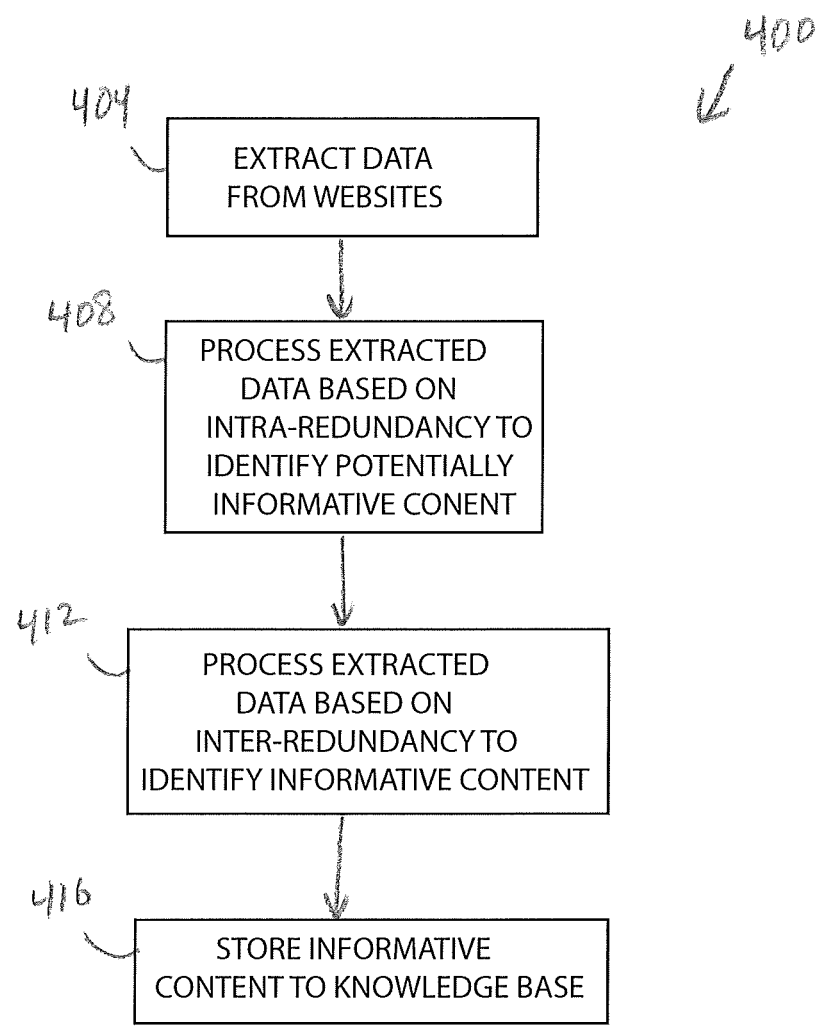
FIG. 4 is a flowchart illustrating an exemplary method of operating the information extraction system of FIG. 1.

As shown in block 404 of FIG. 4, the method 400 includes extracting data from input websites, such as the websites 120, 128, using the remote computer 132. Extracting data includes transferring the electronic data of the websites 120, 128 from the data servers 116, 124 to the memory 184 of the remote computer 132. In one embodiment, the processor 180 executes the web crawler program 190 to locate suitable websites 120, 128 for IE. After suitable websites have been identified, the method 400 uses a technique referred to as web scraping, for example, to download and to organize the electronic data of the input websites in a corpus of data for processing. The method 400 also includes using any process, method, or application in order to arrive at a corpus of data for processing.

Process Extracted Data using Unsupervised IE Approach

Figure 5:
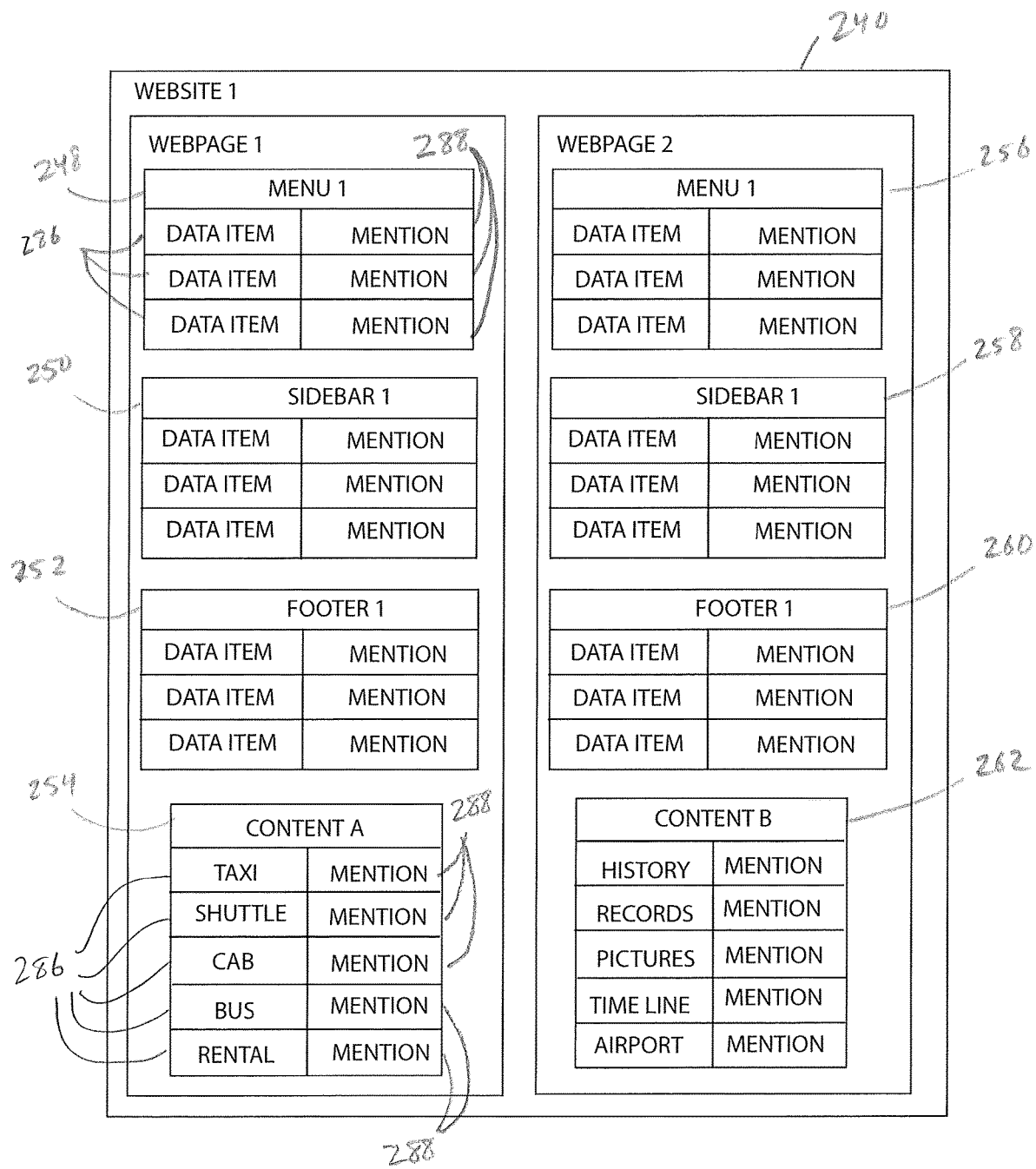
FIG. 5 illustrates an exemplary database table associated with the website of FIG. 2.
Figure 6:
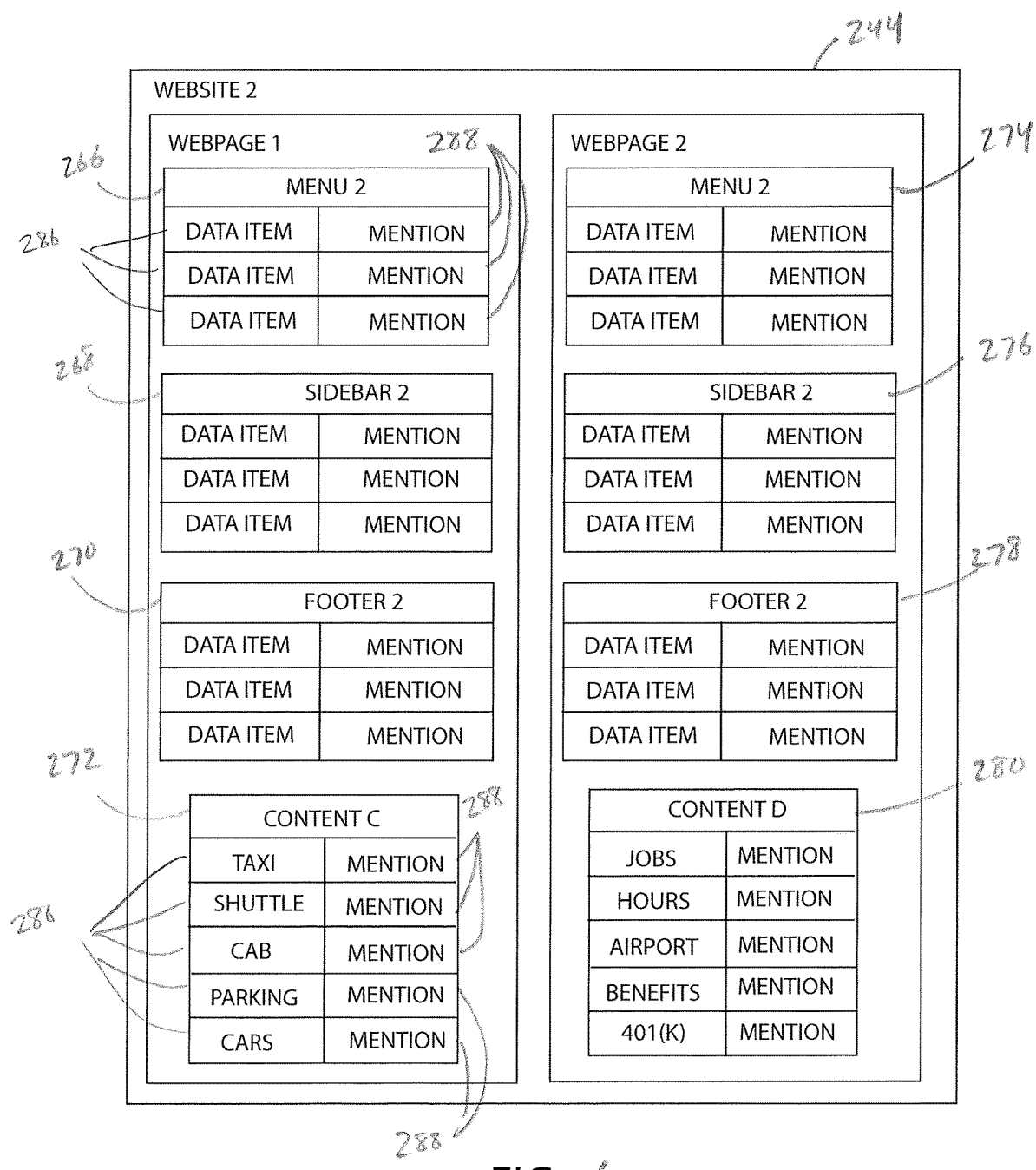
FIG. 6 illustrates an exemplary database table associated with the website of FIG. 3.

Block 404 of the method 400 further includes processing the electronic data from the websites 120, 128 using an unsupervised IE approach in which the content items are organized into a plurality of database tables 240, 244, as shown in FIGS. 5 and 6. The remote computer 132 uses any type of unsupervised IE approach to prepare the database tables 240, 244, such as wrapper induction and automatic extraction. In an exemplary embodiment, the remote computer 132 uses an unsupervised IE approach referred to as data extraction using partial tree alignment (hereinafter "DEPTA"). DEPTA is described in the following paper: Web Data Extraction based on Partial Tree Alignment, by Yan-Hong Zhai and Bing Liu (2005), the disclosure of which is incorporated herein by reference in its entirety. DEPTA is a two-part process that includes identifying individual data records in a webpage, and extracting data items from the identified data records.

As shown in FIGS. 5 and 6, website data that has been processed according to DEPTA is organized into a plurality of exemplary database tables 240, 244. The remote computer 132 processes the content items of the first website 120 using DEPTA to generate the database table 240, which is stored in the memory 184. The database table 240 includes a data group 248, 250, 252, 254, 256, 258, 260, 262 for each content item of the website 120 (i.e. each data record of the website 120). The data group 248 corresponds to the menu 202 of the webpage 196A, the data group 250 corresponds to the sidebar 204 of the webpage 196A, the data group 252 corresponds to the footer 208 of the webpage 196A, the data group 254 corresponds to the content 212A of the webpage 196A, the data group 256 corresponds to the menu 202 of the webpage 196B, the data group 258 corresponds to the sidebar 204 of the webpage 196B, the data group 260 corresponds to the footer 208 of the webpage 196B, the data group 262 corresponds to the content 212B of the webpage 196B.

The remote computer 132 also processes the content items of the website 128 using DEPTA and generates the database table 244, which is stored in the memory 184. The database table 244 includes a data group 266, 268, 270, 272, 274, 276, 278, 280 for each content item of the website 128 (i.e. each data record of the website 128). The data group 266 corresponds to the menu 222 of the webpage 218A, the data group 268 corresponds to the sidebar 226 of the webpage 218A, the data group 270 corresponds to the footer 230 of the webpage 218A, the data group 272 corresponds to the content 234C of the webpage 218A, the data group 274 corresponds to the menu 222 of the webpage 218B, the data group 276 corresponds to the sidebar 226 of the webpage 218B, the data group 278 corresponds to the footer 230 of the webpage 218B, the data group 280 corresponds to the content 234D of the webpage 218B.

Each data group 248, 250, 252, 254, 256, 258, 260, 262, 266, 268, 270, 272, 274, 276, 278, 280 includes a column of data items 286 (left column in FIGS. 5 and 6) and a column of mentions 288 (right columns in FIGS. 5 and 6). The data items 286 are, for example, terms or keywords for which a user may search when using the wireless device 104 to access the knowledge base 140. The data items 286 may also be one or more sentences, phrases, paragraphs, or pages of text, for example. In FIGS. 5 and 6, instead of showing an entire paragraph of text for each data item 286, instead only the most frequently used head noun of the data item 286 is shown. Accordingly, the head noun "taxi" is the most frequently used head noun in the first data item 286 of the data group 254. The mentions 288 are text, numbers, or other data that is associated with the data items 286. In one example, a data item 286 may include a paragraph or line of text describing a taxi company and the corresponding mention 288 includes the phone number of the taxi company. In another example, a data item 286 may include a paragraph describing a hospital and the corresponding mention 288 includes the address of the hospital. The database tables 240, 244 include mostly placeholder data items 286 and mentions 288. Actual data items 286 are provided for the data groups 254, 262, 272, 280 associated with the content 212A, 212B, 234C, 234D. In one embodiment, processor 180 determines the data items 286 and mentions 288 by analyzing HTML tag sequences of the web sites 120, 128. However, any other method may also be used to identify the data items 286 and mentions 288. In the illustrated embodiment, the each data group 248, 250, 252, 254, 256, 258, 260, 262, 266, 268, 270, 272, 274, 276, 278, 280 includes two columns of data; however, in other embodiments, the data groups may have more than two columns of data. In one example, each data group 248, 250, 252, 254, 256, 258, 260, 262, 266, 268, 270, 272, 274, 276, 278, 280 includes two or more columns of mentions 288. In another example, the mentions of the column or columns of mentions 288 are the attributes of corresponding data items 286.

With regard to the website 120, the menu 202 of the webpage 196A is identical to the menu 202 of the webpage 196B. As a result, the corresponding data groups 248, 256 are also identical. Moreover, since the sidebars 204 and the footers 208 of the website 120 are identical so too are the resulting data groups 250, 258 and data groups 252, 260. The content 212A is different from the content 212B; thus, the data group 254 is different from the data group 262, as shown by the different data items 286. The database table 244 of the website 128 is similar. Specifically, since each menu 222 is identical, each sidebar 226 is identical, and each footer 230 is identical, the data groups 266, 274 are identical, the data groups 268,276, and the data groups 270, 278 are identical. The content 234C is different from the content 234D; thus, the data group 272 is different from the data group 280 as shown by the different data items 286.

Process Database Tables with Intra-Redundancy Approach

Next, as shown in block 408, the method 400 includes processing the database tables 240, 244 using an intra-redundancy approach in order to identifying potentially informative content of the websites 120, 128. Stated differently, the method 400 includes processing the database tables 240, 244 to filter out the non-informative content of the websites 120, 128. This process is referred to as an intra-redundancy approach, because redundancy is determined for each data group as compared to only the other data groups of the corresponding database table 240, 244. For example, each data group 248, 250, 252, 254, 256, 258, 260, 262 of the database table 240 is compared to each other data group 248, 250, 252, 254, 256, 258, 260, 262 of the database table 240 to determine intra-redundancy. If the database table 240 includes a redundant data group (i.e. a duplicative data group) then those data groups are considered intra-redundant. If the database table 240 includes a data group 248, 250, 252, 254, 256, 258, 260, 262 that is not duplicative (i.e. that is unique or that is substantially unique), then that data group 248, 250, 252, 254, 256, 258, 260, 262 is not intra-redundant. Accordingly, intra-redundancy processing is for filtering non-informative content from the websites 120, 128.

With reference to FIG. 5, the processor 180 processes the data groups 248, 250, 252, 254, 256, 258, 260, 262 to determine the number of occurrences of each data group within the database table 240. Any data groups 248, 250, 252, 254, 256, 258, 260, 262 having a number of occurrences greater than or equal to a predetermined number of occurrences is considered intra-redundant. Any data group 248, 250, 252, 254, 256, 258, 260, 262 having a number occurrences less than the predetermined number of occurrences is not considered intra-redundant and is considered to contain potentially informative content. In one example, the predetermined number of occurrences is two. In other embodiments, the predetermined number of occurrences is three to five.

The concept here is that if data repeatedly occurs across the webpages of a particular website, then the repeated data is likely from a template and therefore, is not informative content. As an example, consider the typical menu bar (i.e. menus 202, 222) that appears across the top of each webpage of a website. The menu bar is on every webpage of the website and is typically identical on each webpage. The data in the menu bar is typically uninteresting or uninformative outside of navigating the website. Whereas, if data appears only once (or less than a predetermined number of occurrences), then that data is potentially useful, important, and/or interesting and is potentially informative content. An example of this is the content 212A, 212B, 234C, 234D.

To determine intra-redundancy, the processor 180 processes the database tables 240, 244 and identifies any data groups 248, 250, 252, 254, 256, 258, 260, 262, 266, 268, 270, 272, 274, 276, 278, 280 that have fewer than the predetermined number of occurrences for further processing by the processor 180. The data groups 248, 250, 252, 254, 256, 258, 260, 262, 266, 268, 270, 272, 274, 276, 278, 280 that are intra-redundant (i.e. have greater than or equal to the predetermined number of occurrences) are not further processed and are not added to the knowledge base 140. This filtering of data groups 248, 250, 252, 254, 256, 258, 260, 262, 266, 268, 270, 272, 274, 276, 278, 280 is an improvement over an IE system that uses only DEPTA. Therefore, inter-redundancy processing is for identifying or determining the informative content.

For example, the predetermined number of occurrences is two and the processor 180 processes the data groups 248, 250, 252, 254, 256, 258, 260, 262 of the database table 240. The processor 180 determines that that the data groups 248, 250, 252, 256, 258, 260 each occur two times. Thus, the data groups 248, 250, 252, 256, 258, 260 are intra-redundant and are not further processed or added to the knowledge base 140. Thus, in the intra-redundancy processing step, the method 400 excludes intra-redundant data from further processing. The processor 180 also determines that the data groups 254, 262 each occur only one time. Thus, the data groups 254, 262 are not intra-redundant. The data groups 254, 262 are suitable for further processing and contain potentially informative content. The content is potentially informative, because the method 400 applies another level of redundancy processing in determining if the content is informative content.

Process Database Tables with Inter-Redundancy Approach

Next, as shown in block 412 of FIG. 4, the processor 180 uses an inter-redundant approach to determine if any of the non intra-redundant data groups 254, 262, 272, 280 (i.e. the data groups including potentially informative content) are redundant when compared to other websites. This process is referred to as an inter-redundant approach because redundancy is determined across at least two websites. The concept here is that if the information in a data group is informative, then the information is likely to appear in other websites, because it is interesting, important, and/or informative. For example, when considering an airport website the phone number of a taxi service is likely to appear on one of the webpages as potentially informative content. When expanded to a corpus of airport websites, the phone number is also likely to appear on each of the websites, because taxi service is important to customers of every airport. The phone number of the taxi service is typically not intra-redundant and is typically inter-redundant and, therefore, is typically informative content, according to the method 400 set forth herein. As another example, consider a company website having a webpage describing the history of the company. This information is likely not intra-redundant and is also likely not inter-redundant. The information is therefore potentially informative content, but the processor 180 determines that the information is not informative content because the information occurs only on the company website and no other website. Thus, when processing the data extracted from websites, the method 400 searches for data that is non intra-redundant data and that is inter-redundant to add to the knowledge base 140.

In one embodiment, the processor 180 determines that an instant data group having potentially informative content includes informative content if the instant data group, or a data group that is sufficiently similar to the instant data group, is included in at least a predetermined number of database tables. The predetermined number of database tables is greater than one. A typical predetermined number of database tables is two. In other embodiments, the predetermined number of database tables is an integer from three to six.

Figure 7:
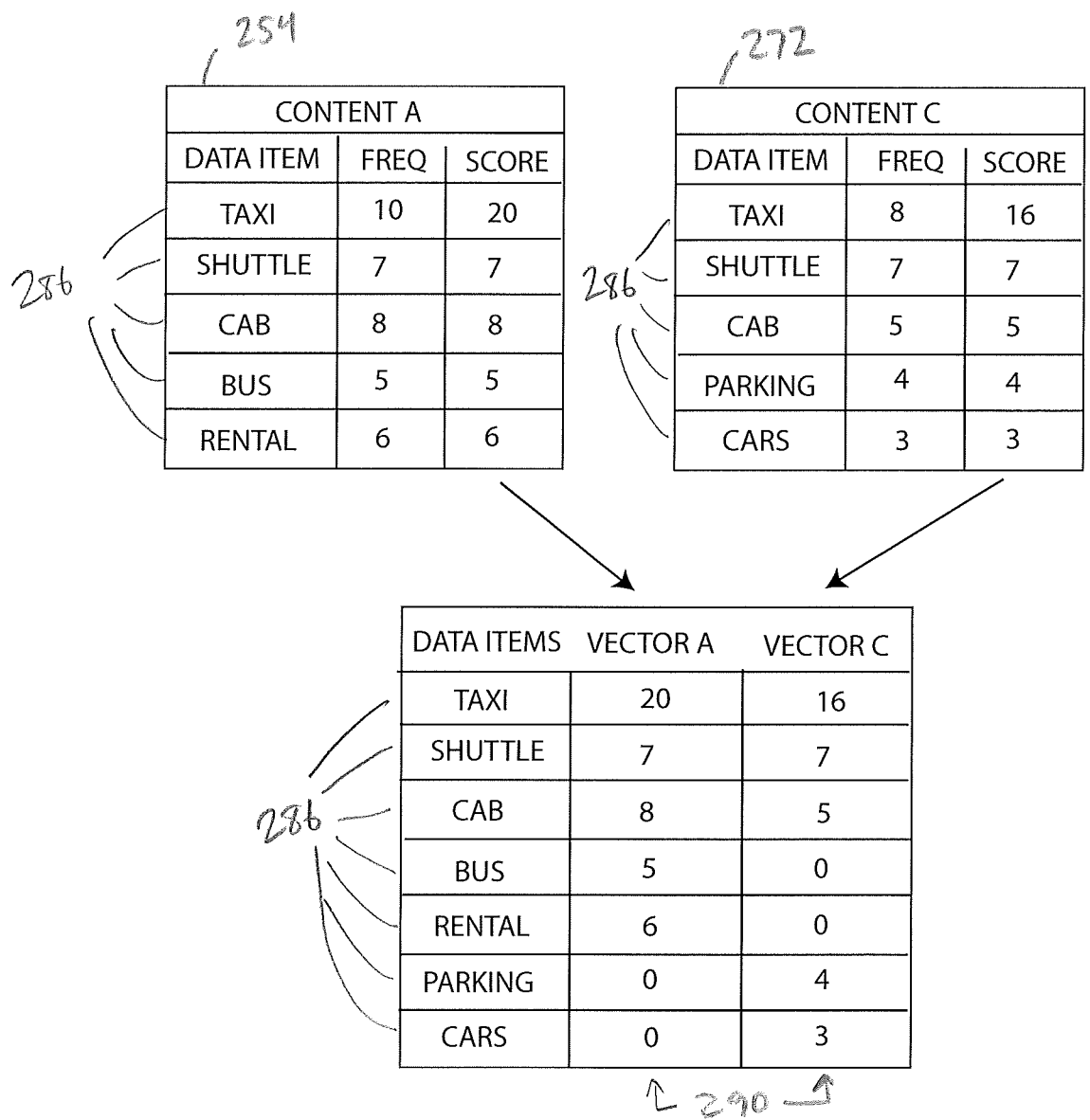
FIG. 7 illustrates a selected data group from the database table of FIG. 5, another selected data group from the database table of FIG. 6, and a table of score vectors based on data items from the selected data groups.

The processor 180 determines if a data group 254, 262, 272, 280 having potentially informative content occurs in more than one database table 240, 244 by assigning scores to the data items 286 of the data groups 254, 262, 272, 280 and then comparing resulting score vectors in a manner that enables the processor 180 to determine the similarity of the data groups 254, 262, 272, 280. As shown in FIG. 7, the data group 254 based on the content 212A from the website 120 and the data group 272 based on the content 234C from the website 128 are compared. The mention column is not included in FIG. 7. The processor 180 has amended the data groups 254, 272 to include two additional columns of data including a frequency column (FREQ) and a score column (SCORE). The frequency column indicates the frequency (i.e. the number of times) that certain words or terms (e.g. head nouns) appear in the corresponding data items 286. For example, in the first data item 286 of the data group 254 the head noun "taxi" is the most frequently used head noun. The head noun "taxi" appears ten times in the text associated with the first data item 286 of the data group 254. The score column, in one embodiment, is based on the frequency column. In particular, the score column doubles the frequency of the most frequently used head noun (or another selected word, term, phrase, or sentence) in the corresponding data group 254, 272. The scores of the other head nouns of the data items 286 are equal to the frequency. Thus, in one example, for the data group 254 the first data item 286 includes the head noun "taxi" ten times, such that "taxi" is the most frequently occurring head noun in the data group 254. Accordingly, the score associated with the first data item 286 is doubled from ten to twenty. An exemplary reason for doubling the frequency count of the most frequently cited head noun is that the head nouns are typically more important than the other words in determining the subject matter of the data group 254, 272. In other embodiments, the processor 180 may make any other desired adjustment to the frequency in order to obtain the score. For example, the score column may equal the frequency column. The same process is used to assign scores to the data items 286 of the data group 272.

Next, the processor 180 forms a normalized vector 290 for each data group 254, 262, 272, 280 having potentially informative content based on the scores. As shown in FIG. 7, the normalized vectors 290 include score entries for each of the data items 286 used in both of the data groups 254, 272 to be compared. Since the data group 254 does not include the data item 286 "parking" a "zero" score has been added to vector A to normalize the vectors. The normalized score vector 290 for the data group 254 is [20, 7, 8, 5, 6, 0, 0], and the normalized score vector 290 for the data group 272 is [16, 7, 5, 0, 0, 4, 3].

After normalizing the score vectors, the processor 180 compares the normalized score vectors 290 to determine if the content of the data groups 254, 272 contain similar contents. In one embodiment, this is done by comparing the cosine similarly of the two normalized vectors 290 to a predetermined threshold similarly level. The cosine similarity of the vectors 290 is given by equation (1) and is equal to the dot product of the vectors 290 divided by the product of the norm of the vectors 290.

$$\text{cosine similarity} = \frac{\vec{a} \cdot \vec{b}}{\|\vec{a}\|\|\vec{b}\|} \quad (1)$$

If the cosine similarity is less than a threshold similarity level then the data in the compared data groups 254, 272 is dissimilar and does not appear on both websites 120, 128. If the cosine similarity is greater than or equal to the similarity threshold, then the data in the compared data groups 254, 272 is similar and appears on both websites 120, 128. Data groups having a cosine similarity greater than or equal to the similarity threshold are inter-redundant. With regard to the normalized vectors A and B (vectors 290) the dot product is equal to 409 (20*16+7*7+8*5+5*0+6*0+0*4+0*3), the norm of vector A is 24.0 ($\text{sqrt}(20^2+7^2+8^2+5^2+6^2)$), and the norm of vector B is 18.8 ($\text{sqrt}(16^2+7^2+5^2+4^2+3^2)$) Thus, the cosine similarity of normalized vectors A and B is 0.91 (409/(24.0*18.8)).

Cosine similarly ranges from 0 to 1. Two vectors are dissimilar if the cosine similarly is 0, and two vectors are identical if the cosine similarity is 1. The processor 180 compares the calculated cosine similarity to the predetermined threshold similarly level. An exemplary predetermined threshold similarly level is 0.8. If the processor 180 determines that two normalized vectors have a cosine similarity greater than or equal to 0.8, then the processor 180 determines that the two score vectors correspond to data groups that are inter-redundant. That is, the processor 180 determines that the same information is present in both of the compared data groups and that the potentially informative content of the data groups is informative content. In the above example, the cosine similarity of the normalized vectors 290 associated with data groups 254, 272 is greater than the predetermined threshold similarity level (0.91>0.8) and the processor 180 determines that the data groups 254, 272 are inter-redundant and include informative content. As a result, the content of the data groups 254, 272 is suitable for inclusion in the knowledge base 140.

Figure 8:
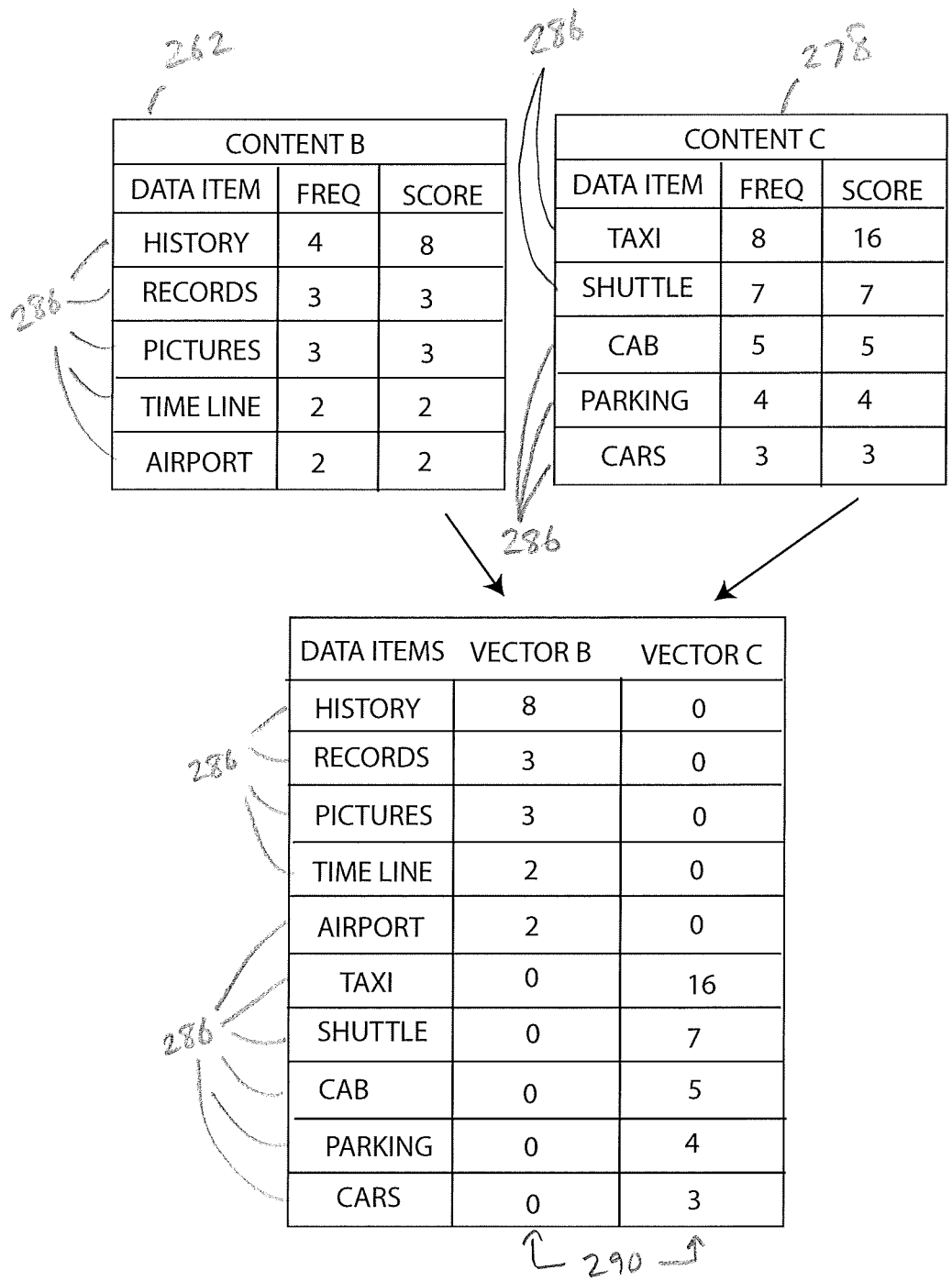
FIG. 8 illustrates a selected data group from the database table of FIG. 5, another selected data group from the database table of FIG. 6, and a table of score vectors based on data items from the selected data groups.

As another example, consider a comparison between the content 212B and contents 234C and 234D. As shown in FIG. 8, there is no overlap between the data items 286 of data group 262 of the content 212B (FIG. 2) and the data items 286 of the data group 278 of the content 234C (FIG. 3), thus, the dot product of the normalized score vectors is zero and the cosine similarity between the vectors is zero. Since zero is below the predetermined threshold similarity level of 0.8, the processor 180 determines that content 212B and content 234C are different from each other and are not inter-redundant. Considering the comparison between the content 212B and content 234D, only one data item 286 overlaps; namely, the data item 286 "airport." Thus, there is some similarly between the two contents 212B, 234D. Specifically, using the scoring approach descried above, the cosine similarity between the normalized vectors (not shown) associated with the contents 212B, 234D is 0.04. Thus, even though the contents 212B, 234D share a data item 286, that data item 286 is not a highly scored data item 286. As a result, the cosine similarly between the contents 212B, 234D is below the predetermined threshold similarity level of 0.8. Therefore, the processor 180 determines that the content 212B occurs only on the website 120 and does not occur on the website 128, because the content 212B is dissimilar to the contents 234C, 234D. The processor 180 further determines that the content 212B is not directed to informative content, and the knowledge base 140 should not be updated based on the content 212B In summary, the processor 180 determines that the contents 212A, 234C include informative content because the corresponding data groups 254, 272 include inter-redundant information. The processor 180 determines that the content 212B does not include informative content, because the corresponding data group 262 does not include inter-redundant information. The method 400 does not require human intervention in order to identify the informative content.

Update Knowledge Base with Informative Content

Next, as shown in block 416 of FIG. 4, the method 400 includes the processor 180 adding the informative content 212A, 234C to the knowledge base 140. When the additional informative content 212A, 234C is saved to the knowledge base 140, the knowledge base 140 is even better equipped to provide accurate information to inquiries from client devices, such as the wireless device 104.

Exemplary Test Results

As shown in Table 1 inset below, evaluation results of the IE system 100 are provided that compare the precision ("P"), recall ("R"), and f-score ("F") of three IE systems. The first IE system is an unsupervised IE system that uses only DEPTA. The second is an unsupervised IE system that uses DEPTA and intra-redundancy processing. The third is the unsupervised IE system 100 that uses DEPTA, intra-redundancy, and inter-redundancy processing.

The three IE systems were tested against a corpus of websites associated with airports in the United States and a corpus of websites associated with hospitals in the United States. The tests directed to the airport corpus focused on information associated with parking lots, car rentals, shuttles, buses, and taxis. The tests directed to the hospital corpus focused on service area, disease, symptoms, phone numbers, and working hours.

The test results were determined by querying the knowledge bases formed by the three IE systems described above. As used herein and in the equations described below, a "system mention" is a mention that was extracted from a website according to one of the three IE systems. The knowledge base 140, for example, includes a plurality of the system mentions. Also, as used herein, a "ground-truth mention" is a mention that was manually extracted from a website by a technician or engineer for purposes of generating the test results presented above in Table 1.

As is typically done in the IE context, test results were generated for partial matches and exact matches. A partial match refers to querying a knowledge base with a search term and having the knowledge base return a result that only partially matches the search term. For example, a query may include the term "taxi provider," and the knowledge base may return mentions including "taxi," "provider," "taxi service," and "service provider," each of which is a partial match because the mentions include at least one of the search terms. An exact match refers to querying the knowledge base with a search term that exactly matches a system mention. For example, a query may include the term "taxi provider," and the knowledge base may return the mention "taxi provider," which is an exact match.

The Partial Match columns were calculated according to equations (2) and (3) presented below. Equation (2) calculates the precision of a partial match by dividing the number of partially matched system mentions by the number of system mentions.

$$P = \frac{\#(\text{partially matched system mentions})}{\#(\text{system mentions})} \quad (2)$$

Equation (3) determines the recall of a partial match. Recall measures the percentage of the ground truth mentions that are discovered by the system. Equation (3) determines recall by dividing the number of partially matched ground truth mentions by the number of ground truth mentions.

$$R = \frac{\#(\text{partially matched ground truth mentions})}{\#(\text{ground truth mentions})} \quad (3)$$

The Exact Match columns were calculated according to equations (4) and (5) presented below. Equation (4) determines precision by dividing the number of exactly matched system mentions by the number of system mentions.

TABLE 1

| System | Airport Corpus | | | | | | Hospital Corpus | | | | | |
| | Exact Match | | | Partial Match | | | Exact Match | | | Partial Match | | |
| | P | R | F | P | R | F | P | R | F | P | R | F |
| DEPTA | 0.12 | 0.65 | 0.20 | 0.15 | 0.80 | 0.25 | 0.19 | 0.79 | 0.31 | 0.43 | 0.92 | 0.58 |
| +Intra-R | 0.29 | 0.65 | 0.40 | 0.37 | 0.80 | 0.51 | 0.52 | 0.68 | 0.59 | 0.71 | 0.86 | 0.77 |
| +Intra-R and Inter-R | 0.42 | 0.61 | 0.50 | 0.52 | 0.74 | 0.61 | 0.67 | 0.60 | 0.63 | 0.86 | 0.80 | 0.83 |

$$P = \frac{\#(\text{exactly matched system mentions})}{\#(\text{system mentions})} \quad (5)$$

Equation (5) determines recall by dividing the number of exactly matched ground truth mentions by the number of ground truth mentions.

$$R = \frac{\#(\text{exactly matched key mentions})}{\#(\text{ground truth mentions})} \quad (5)$$

The F-score is a harmonic mean of the precision and the recall. The F-score was calculated using equation (6) as presented below.

$$Fscore = 2 * \frac{\text{PRECISION} * \text{RECALL}}{\text{PRECISION} + \text{RECALL}} \quad (6)$$

In Table 1 higher numbers correspond to a better performing IE system. Table 1 shows that for both the Airport corpus and the Hospital corpus that the unsupervised IE system 100 outperforms, the IE system that uses only DEPTA, and the IE system that uses DEPTA and only intra-redundancy processing. This is made evident by the f-score of the system 100, which is higher than the f-scores of the other IE systems. In detail, the IE system 100 generates a huge gain in precision for both partial matches and exact matches as compared to the other two IE systems. The IE system 100 suffers only a minor loss in recall as compared to the other two IE systems. The huge gain in precision offsets the small loss in recall and causes the f-score of the IE system 100 to far exceed the f-score of the other IE systems.

Figure 9A:
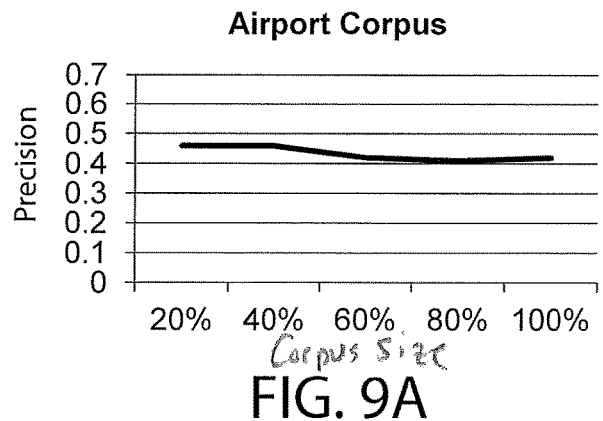
FIG. 9A is a graph of precision verses corpus size for a corpus consisting of data from airport websites.
Figure 9B:
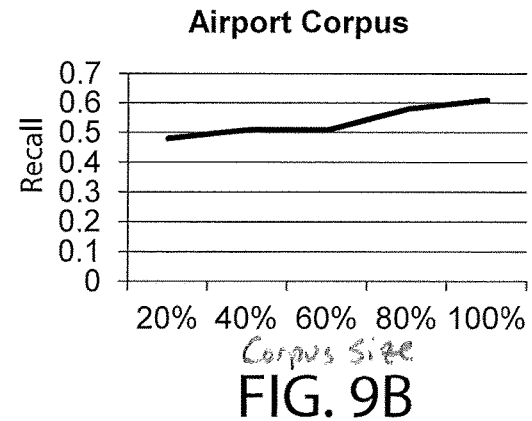
FIG. 9B is a graph of recall verses corpus size for a corpus consisting of data from airport websites.
Figure 9C:
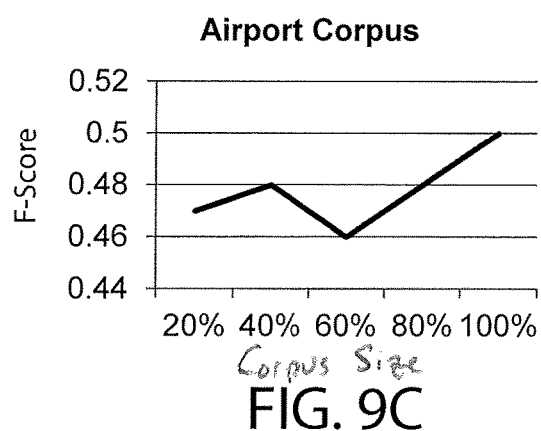
FIG. 9C is a graph of F-score verses corpus size for a corpus consisting of data from airport websites.
Figure 9D:
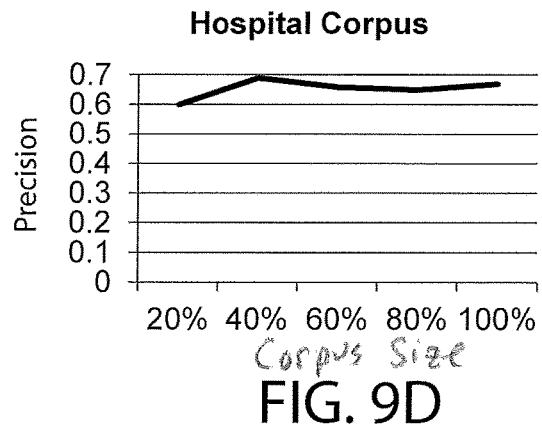
FIG. 9D is a graph of precision verses corpus size for a corpus consisting of data from hospital websites.
Figure 9E:
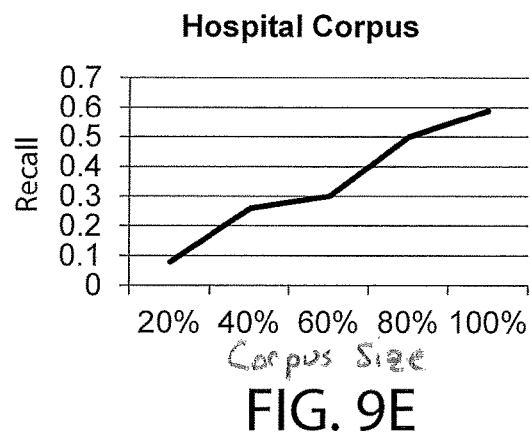
FIG. 9E is a graph of recall verses corpus size for a corpus consisting of data from hospital websites.
Figure 9F:
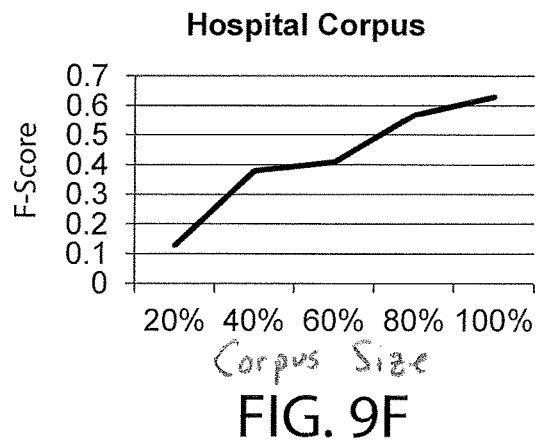
FIG. 9F is a graph of f-score verses corpus size for a corpus consisting of data from hospital websites.

The precision, recall, and performance of the IE system 100 are plotted in FIGS. 9A through 9F for differently sized corpuses. As shown in FIGS. 9A and 9D, the precision of the IE system 100 is substantially constant versus the size of the corpus. That is, adding additional websites to the corpus does not substantially improve the precision of the IE system 100. As shown in FIGS. 9B and 9E, the recall of the IE system 100 generally increases in response to increasing the size of the corpus, as is expected. As shown in FIGS. 9C and 9F, the f-score of the IE system 100 also generally increases in response to increasing the size of the corpus.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of adding informative content to an electronic knowledge base comprising:
   generating a plurality of database tables from a plurality of websites, each database table based on one corresponding website of the plurality of websites, and each database table including a plurality of data groups;
   individually processing each database table of the plurality of database tables to identify intra-redundant data groups and not intra-redundant data groups, the not intra-redundant data groups corresponding to data groups having less than a predetermined number of occurrences in a corresponding one of the database tables, and the intra-redundant data groups corresponding to data groups having at least the predetermined number of occurrences in the corresponding one of the database tables;
   not further processing the intra-redundant data groups;
   identifying as informative content only the identified not intra-redundant data groups that are included in a first predetermined number of the database tables of the plurality of database tables according to an inter-redundancy approach based on multiple websites of the plurality of websites, the first predetermined number greater than one; and
   adding the informative content to the electronic knowledge base.

2. The method of claim 1, wherein:
   a first database table of the plurality of database tables is generated from a first website of the plurality of websites having a plurality of webpages;
   each webpage includes a plurality of content items; and
   each data group of the first database table is based on at least one content item of the plurality of content items, wherein the plurality of content items includes at least one of a menu, a sidebar, a footer, and an area of content.

3. The method of claim 1, wherein identifying as informative content comprises:
   assigning a score to the identified not intra-redundant data groups from each database table;
   comparing a first score of the identified not intra-redundant data groups from a first database table to a second score of the identified not intra-redundant data groups from a second database table; and
   determining that the identified not intra-redundant data groups from the first database table are informative content if the comparison of the first score to the second score indicates that the identified not intra-redundant data groups from the first database table are included in the first database table and the second database table.

4. The method of claim 3, wherein:
   the first database table includes a first data group of the plurality of data groups having a first plurality of data items;
   the second database table includes a second data group of the plurality of data groups having a second plurality of data items;
   assigning scores to the identified not intra-redundant data groups from each database table comprises
      assigning a numerical value to data items of the first plurality of data items to form a first score vector, and
      assigning a numerical value to data items of the second plurality of data items to form a second score vector;
   comparing the first score to the second score comprises determining a cosine similarity between the first score vector and the second score vector; and
   determining that the identified not intra-redundant data groups from the first database table are included in the first database table and the second database table if the cosine similarity is greater than or equal to a predetermined threshold.

5. The method of claim 4, further comprising:
   doubling the numerical value assigned to a data item of the first plurality of data items that occurs most frequently in the first plurality of data items; and
   doubling the numerical value assigned to a data item of the second plurality of data items that occurs most frequently in the second plurality of data items.

6. The method of claim 4, further comprising:
determining the first plurality of data items by analyzing HTML tag sequences of a first website associated with the first database table; and
determining the second plurality of data items by analyzing HTML tag sequences of a second website associated with the second database table.

7. The method of claim 6, wherein the first website and the second website have different internet protocol addresses.

8. An information extraction system comprising:
a remote computer operably connected to the Internet and including a processor configured to
generate a plurality of database tables from a plurality of websites accessible via the Internet, each database table based on one corresponding website, and each database table including a plurality of data groups;
individually process each database table of the plurality of database tables to identify intra-redundant data groups and not intra-redundant data groups;
not further processing the intra-redundant data groups;
identify as informative content only the identified not intra-redundant groups that are included in a first predetermined number of the database tables of the plurality of database tables according to an inter-redundancy approach based on multiple websites of the plurality of websites, the first predetermined number being greater than one; and
add the identified informative content to an electronic knowledge base.

9. The information extraction system of claim 8, wherein:
a first database table of the plurality of database tables is generated from only a first website of the plurality of websites having a plurality of webpages; and
each webpage includes a plurality of content items.

10. The information extraction system of claim 8, wherein the processor is further configured to:
identify the informative content by
assigning a score to the identified not intra-redundant data groups from each database table;
comparing a first score of the identified not intra-redundant data groups from a first database table to a second score of the identified not intra-redundant data groups from a second database table; and
determining that the identified not intra-redundant data groups from the first database table are informative content if the comparison of the first score to the second score indicates that the identified not intra-redundant data groups from the first database table is included in the first database table and the second database table.

11. The information extraction system of claim 10, wherein:
the first database table includes a first data group of the plurality of data groups having a first plurality of data items;
the second database table includes a second data group of the plurality of data groups having a second plurality of data items;
the processor is further configured to assign scores to the identified not intra-redundant data groups from each database table by
assigning a numerical value to data items of the first plurality of data items to form a first score vector, and
assigning a numerical value to data items of the second plurality of data items to form a second score vector;
comparing the first score to the second score comprises determining a cosine similarity between the first score vector and the second score vector; and
determining that the identified not intra-redundant data groups from the first database table are included in the first database table and the second database table if the cosine similarity is greater than or equal to a predetermined threshold.

12. The information extraction system of claim 11, wherein the processor is further configured to assign the score by (i) doubling the numerical value assigned to the data item of the first plurality of data items that occurs most frequently in the first plurality of data items, and (ii) doubling the numerical value assigned to the data item of the second plurality of data items that occurs most frequently in the second plurality of data items.

13. The information extraction system of claim 11, wherein the processor is further configured to:
determine the data items of the first plurality of data items by analyzing HTML tag sequences of a first website associated with the first database table; and
determine the data items of the second plurality of data items by analyzing HTML tag sequences of a second website associated with the second database table.

14. The information extraction system of claim 13, wherein the first website and the second website have different internet protocol addresses.

15. The information extraction system of claim 8, further comprising:
a data server operably connected to the Internet and to the remote computer, the data server configured to store the electronic knowledge base.

16. The information extraction system of claim 8, further comprising:
a client operably connected to the Internet and configured to access the electronic knowledge base.

* * * * *